United States Patent [19]  [11] 4,167,990
Steer et al. [45] Sep. 18, 1979

[54] DRUM BRAKE HAVING ANTI-RATTLE SPRING CLIP

[75] Inventors: John E. Steer, Windsor, Canada; James J. Colpaert; John L. Turak, both of South Bend, Ind.

[73] Assignee: The Bendix Corporation, Southfield, Mich.

[21] Appl. No.: 838,694

[22] Filed: Oct. 3, 1977

[51] Int. Cl.² ............................................. F16D 65/00
[52] U.S. Cl. ........................ 188/205 A; 188/106 A; 267/164
[58] Field of Search ............. 188/73.5, 79.5 P, 106 A, 188/106 F, 205 A, 325, 328, 340; 267/158, 164

[56] References Cited
U.S. PATENT DOCUMENTS

| 2,192,012 | 2/1940 | LaBrie | 188/106 A |
| 2,211,439 | 8/1940 | Schnell et al. | 188/340 |
| 2,910,144 | 10/1959 | Burnett | 188/340 |
| 3,551,921 | 1/1971 | Fox et al. | 267/164 |

FOREIGN PATENT DOCUMENTS

| 104979 | 7/1926 | Austria | 267/164 |
| 1005855 | 4/1957 | Fed. Rep. of Germany | 188/106 A |
| 1186047 | 4/1970 | United Kingdom | 188/340 |

Primary Examiner—Edward R. Kazenske
Attorney, Agent, or Firm—Paul David Schoenle; Ken C. Decker

[57] ABSTRACT

A drum brake assembly includes a backing plate for supporting a pair of brake shoes and a hydraulic actuator which cooperates with the pair of brake shoes to urge the latter into a braking position. A parking lever is pivotally mounted on one of the brake shoes and a strut connects the parking lever with the other brake shoe such that rotation of the parking lever when the parking brake is applied urges the pair of brake shoes into a braking position. In order to connect the strut to the other brake shoe while at the same time eliminating any rattle between the pair of brake shoes and the struts, a spring clip releasably connects with the other brake shoe and resiliently engages the strut to bias the latter toward the one brake shoe. The spring clip is substantially U-shaped with at least one opening for receiving the strut and for maintaining the strut in juxtaposition to the other brake shoe.

1 Claim, 8 Drawing Figures

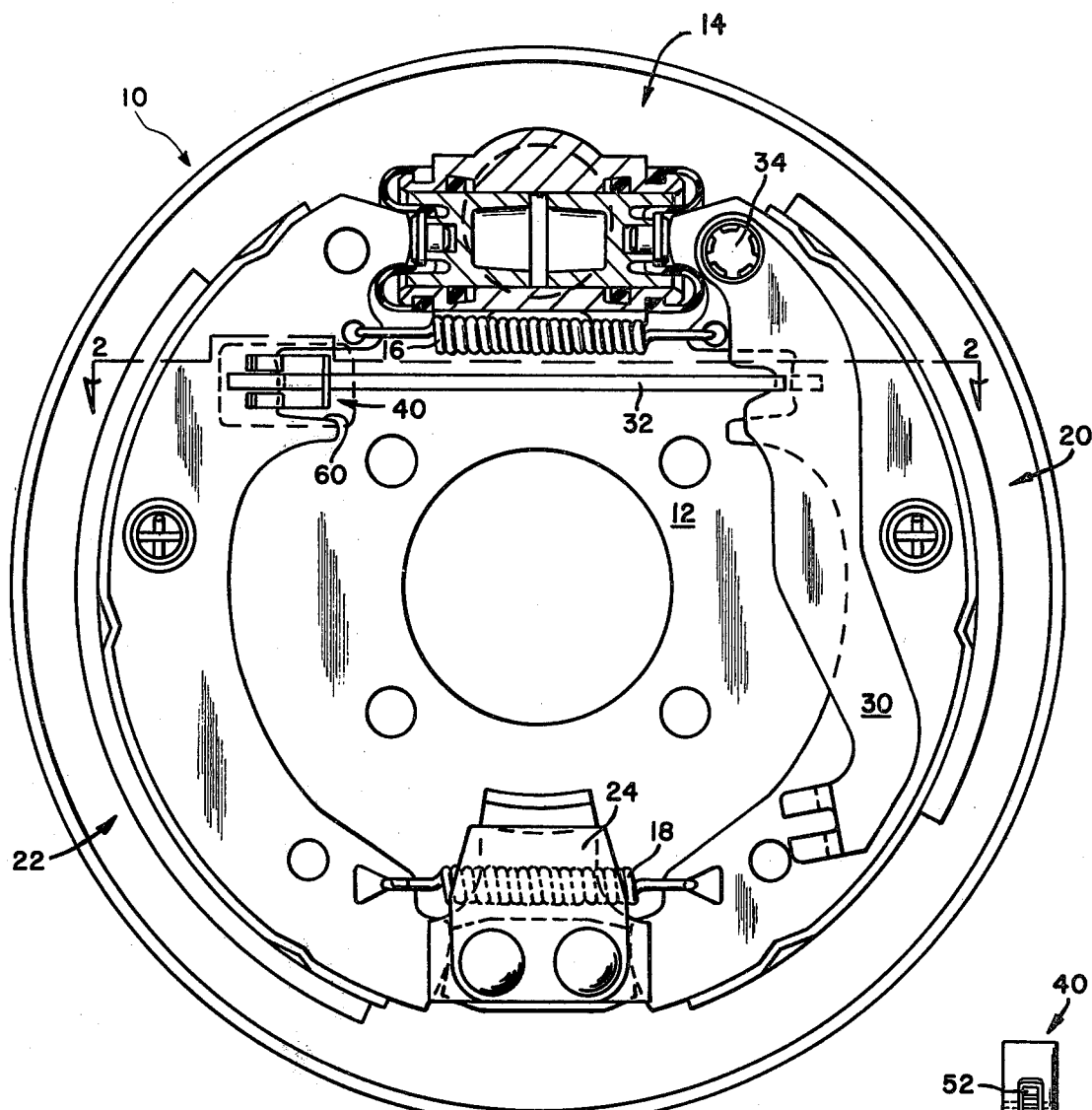
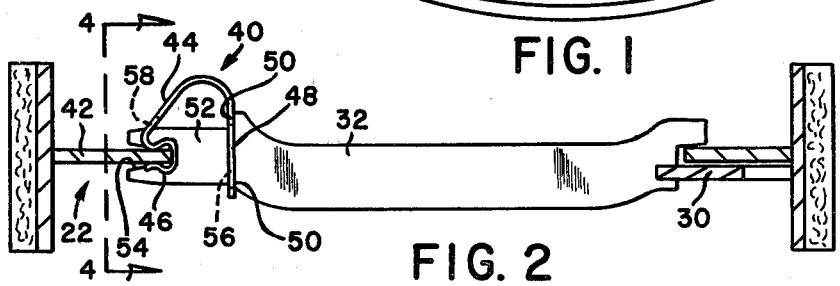
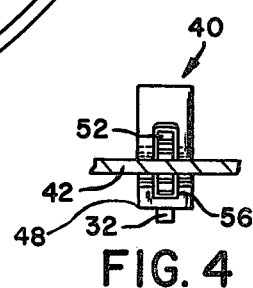
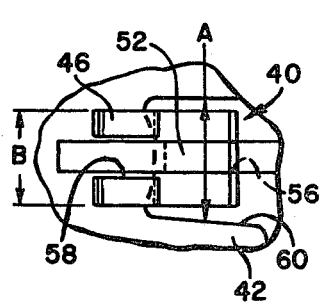
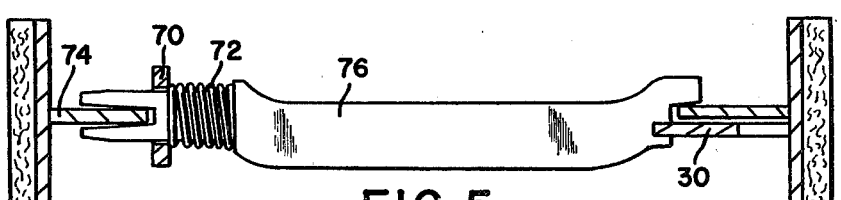
FIG. 1
FIG. 4
FIG. 2
FIG. 3
FIG. 5
PRIOR ART

DRUM BRAKE HAVING ANTI-RATTLE SPRING CLIP

BACKGROUND OF THE INVENTION

A drum brake assembly is generally provided with a hydraulic actuator which cooperates with a pair of brake shoes to urge the latter into a braking position during a braking application. In order to move the pair of brake shoes to a braking position when a parking brake is applied, a parking lever is pivotally mounted relative to one brake shoe and a strut is connected with the other brake shoe such that pivoting of the parking lever causes the pair of brake shoes to move to the braking position. A washer and coil spring are disposed between the other brake shoe and the strut to eliminate rattle therebetween and maintain the strut in a non-braking position.

SUMMARY OF THE INVENTION

The present invention relates to an improvement over the drum brake assembly mentioned above, wherein the washer and coil spring used to position the strut are eliminated and a spring clip is disposed between the strut and the other brake shoe to eliminate rattle and position the strut. The spring clip includes at least one opening and the strut extends through the opening in order to engage the other brake shoe.

In particular, the spring clip of one embodiment is substantially U-shaped with one arm thereof forming a slot and the other arm forming the opening. The one arm also releasably attaches to the other brake shoe for mounting the spring clip thereon and the other arm resiliently engages the strut to urge the latter toward the parking lever. At the point on the other brake shoe where the one arm is releasably attached, there is a cutout for releasably receiving the U-shaped spring clip. Another embodiment of the U-shaped spring clip includes openings on each arm to receive the strut and recesses on each arm receive the web of the other brake shoe to dispose the spring clip between the other brake shoe and the strut. This other embodiment is reversible so that the spring clip will function in a backwards or in an upside down position.

BRIEF DESCRIPTION OF THE DRAWINGS

FIG. 1 is a cross-sectional view of a drum brake assembly constructed in accordance with the present invention;

FIG. 2 is a cross-sectional view taken along line 2—2 of FIG. 1;

FIG. 3 is an enlarged partial cross-sectional view of the encircled portion of FIG. 1;

FIG. 4 is a right side view along line 4—4 of FIG. 2;

FIG. 5 is a view similar to FIG. 2, showing a prior art construction;

DETAILED DESCRIPTION

Figure 6:
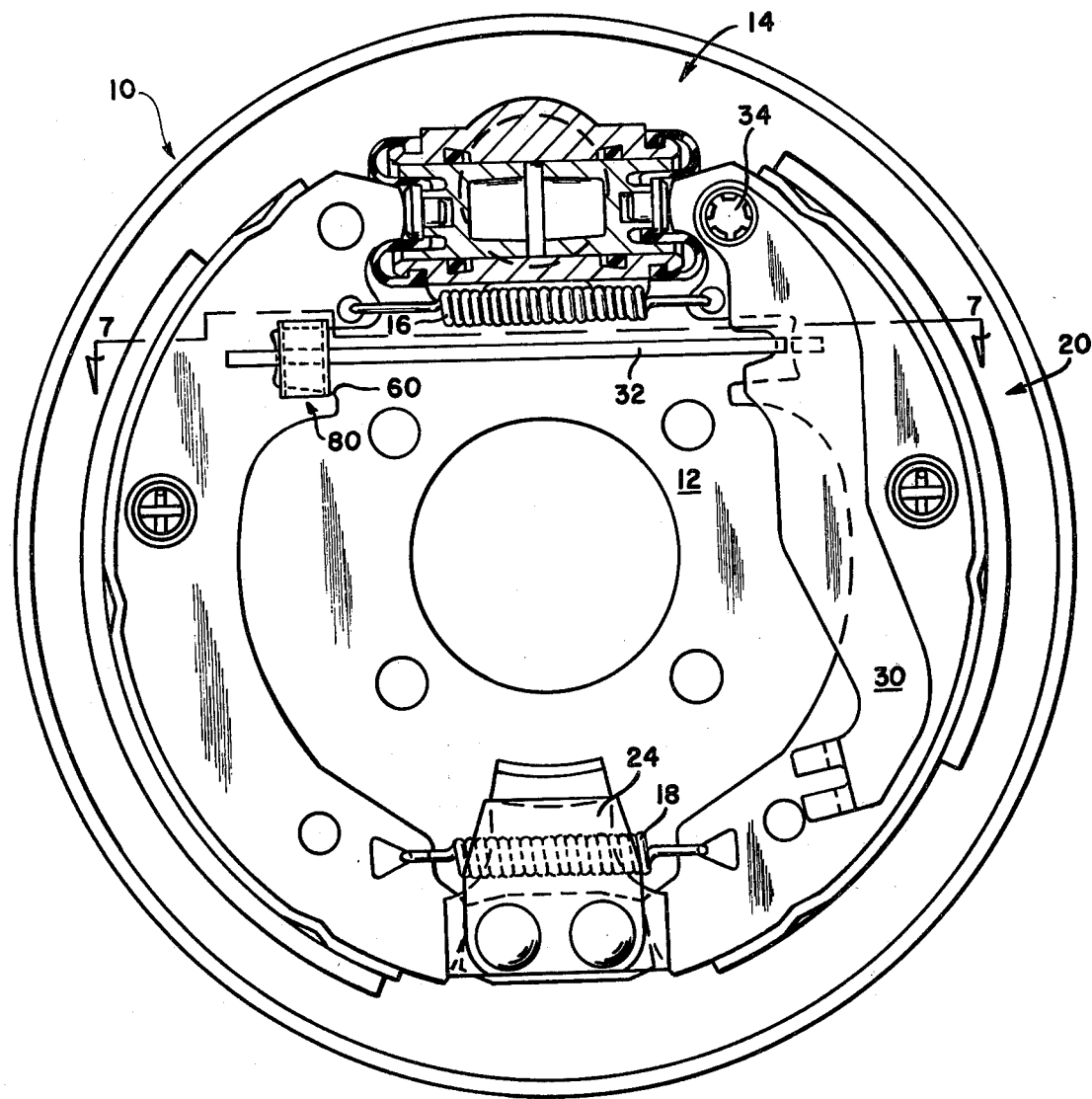
FIG. 6 is a cross-sectional view of a drum brake assembly showing another embodiment of the present invention.

In the drum brake assembly of FIG. 1, a drum brake, generally indicated by reference numeral 10, includes a backing plate 12 which supports a hydraulic actuator 14. Spring members at 16 and 18 bias a pair of brake shoes 20 and 22 into engagement with the hydraulic actuator 14 and a fulcrum bracket 24, respectively.

The one brake shoe 20 pivotally anchors a parking lever 30 near the hydraulic actuator 14. While the hydraulic actuator 14 is operable under pressurized fluid to urge the pair of brake shoes into a braking position, the parking lever is connected to a parking brake pedal (not shown) in order to provide a mechanical or manual application of the drum brake 10 to urge the pair of brake shoes into a braking position. A brake strut 32 extends from the parking lever 30 to the other brake shoe 22, so that pivoting of the parking lever 30 in a clockwise direction, viewing FIG. 1, about pin 34 pivots the pair of brake shoes about the fulcrum bracket 24, thereby spreading the pair of brake shoes into a braking position.

In accordance with the invention, a spring clip 40 is disposed between the other brake shoe 22 and the strut 32. Turning to FIG. 2, it is seen that the other brake shoe 22 includes a web 42 and that the spring clip 40 is substantially U-shaped. One arm 44 of the U-shaped spring clip defines a flexible clamp 46 which frictionally engages the web when the clamp is inserted over the web 42. The other arm 48 of the U-shaped spring clip abuts shoulders 50 on the strut 32 and urges the latter towards the parking lever 30 due to the inherent resiliency of the spring clip 40.

The strut 32 forms an end projection 52 adjacent the other brake shoe 22 and extending from the strut shoulders 50 to interconnect with the web 42 by means of a recess 54 on the end projection which receives the web. As illustrated in FIG. 2, the other arm 48 completely encircles the portion of strut 32 which extends through an opening 56 formed in the other arm 48 and the one arm 44 forms an open ended slot 58 for receiving the end projection 52. The other arm 48 abuts shoulders 50 at both ends of the opening 56 and the projection 52 cooperates with the opening 56 on arm 48 to maintain the arm 48 in abutment with the strut.

Turning to FIG. 3, the web 42 is provided with a cutout 60 such that the clamp 46 of the spring clip is received on the web at the cutout 60 and the width A of the cutout 60 is substantially equal to or greater than the uniform width B of the spring clip 40. Consequently, when the spring clip is attached to the web 42, the spring clip is prevented from sliding or slipping vertically, as the spring clip extends into the cutout 60.

Figure 7:
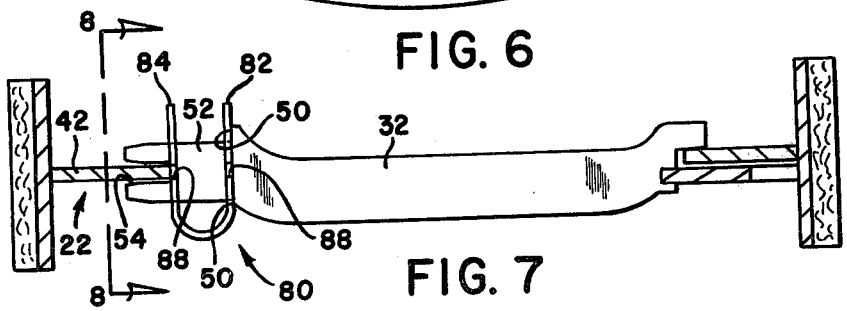
FIG. 7 is a cross-sectional view taken along line 7—7 of FIG. 6.
Figure 8:
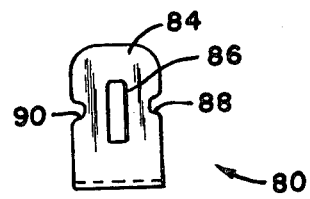
FIG. 8 is a view of the spring clip constructed according to the present invention and taken along line 8—8 of FIG. 7.

It is noted viewing FIG. 7 and FIG. 8 that the openings 86 include a length substantially equal to the width of the projection 52. Moreover, the U-shaped spring clip 80 is biased to open the arms 82 and 84 so that during assembly the U-shaped spring clip will remain attached to the strut 32 because the spreading of the arms 82 and 84 causes the openings 86 to frictionally engage the projection 52. This is in contrast to the clamp 46 of the embodiment of FIGS. 1-4 wherein the U-shaped spring clip 40 is attached to the other brake shoe during assembly.

In contrast to the invention herein, FIG. 5 shows a prior art structure wherein a washer 70 and a coil spring 72 cooperate with a brake shoe web 74 and a strut 76 to eliminate rattle therebetween. During assembly when the strut 76 is spaced from the web 74, the washer 70 and coil spring 72 are free to slip off of the strut 76. Consequently, this prior art structure is cumbersome to assemble and requires a two-piece construction to eliminate rattle.

In the alternative embodiment of FIGS. 6-8, a spring clip 80 is substantially U-shaped to form arms 82 and 84. Each arm includes an opening 86 for receiving the end projection 52 of the strut 32. Moreover, each arm includes recesses at 88 and 90 for connecting the spring clip with the web 42. The top recesses at 88 receive the portion of the web 42 above the cutout 60 while the bottom recesses at 90 receive the portion of the web 42 below the cutout 60. The openings 86 and the recesses 88 and 90 cooperate, respectively, with the strut 32 and the web 42 to position the spring clip therebetween. Moreover, the width of the spring clip 80 is larger than the width A of the cutout 60 so that the web will extend into the recesses at 88 and 90.

Turning to FIG. 8, it is seen that the spring clip 80 is axially symmetrical so that the cutouts 88 can be disposed on the bottom and the cutouts 90 can be disposed on the top. In addition, the spring clip 80 is reversible so that the arms 82 and 84 can extend axially inwardly, as shown in FIG. 7, or axially outwardly. In FIG. 7 the arm 82 resiliently engages the shoulders 50 and the arm 84 resiliently opposes the web 42 to urge the strut 32 towards the parking lever 30.

In conclusion, it can be seen from the foregoing description that the spring clips 40 and 80 of the drum brake assembly 10 provide a simple anti-rattle connection between the other brake shoe 22 and the strut 32. Moreover, as the spring clip 40 is releasably attached to the other brake shoe 22 the assembly of drum brake 10 is simplified and the number of parts required to eliminate rattle is reduced.

Although many variations will be apparent to those skilled in the art, it is intended that these variations fall within the scope of the appended claims.

We claim:

1. In a drum brake having a backing plate for supporting a pair of brake shoes, a hydraulic actuator operable to urge the pair of brake shoes into a braking position, a parking lever movable relative to one of the pair of brake shoes to urge the pair of brake shoes into a braking position, and a strut connecting the parking lever with the other brake shoe, the improvement wherein a spring clip includes one arm releasably clamped to the other brake shoe and another arm resiliently engaged with the strut, said spring clip urging the strut toward the parking lever to substantially eliminate rattle between the strut, parking lever, and other brake shoe, said one arm having an open ended slot for receiving the strut and said other arm having an opening for receiving the strut, said other arm encircling the strut at said opening to maintain said other arm in resilient engagement with the strut.

* * * * *